Aug. 21, 1928.
U. A. WHITAKER
1,681,563
ELECTROPNEUMATIC BRAKE
Filed April 11, 1927
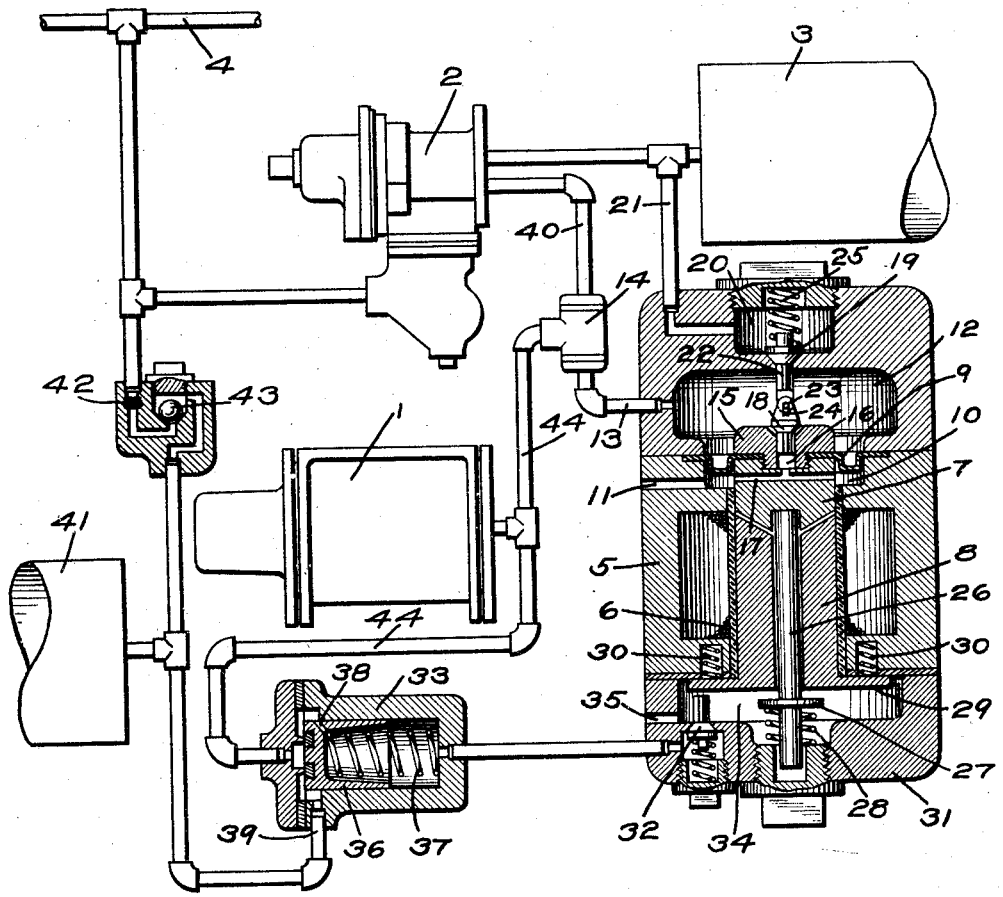
INVENTOR:
UNCAS A. WHITAKER
BY *Wm. M. Cady*
ATTORNEY Patented Aug. 21, 1928.

1,681,563

UNITED STATES PATENT OFFICE.

UNCAS A. WHITAKER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed April 11, 1927. Serial No. 182,746.

This invention relates to electro-pneumatic brakes and has for its principal object to provide an improved electro-pneumatic brake in which an emergency application of the brakes may be effected electro-pneumatically.

In the accompanying drawing, the single figure is a diagrammatic view, partly in section, of an electro-pneumatic brake equipment embodying my invention.

In the drawing, the electro-pneumatic brake apparatus is shown associated with a fluid pressure brake equipment comprising a brake cylinder 1, a triple valve device 2, an auxiliary reservoir 3, and a brake pipe 4, all of the usual construction.

The electro-pneumatic control portion comprises a magnet controlled valve device including an electro-magnet 5 having a coil 6 and solenoid armatures 7 and 8 forming the core of the magnet. The armature 7 is associated with a flexible diaphragm 9 having chamber 10 at one side open to the atmosphere through port 11, and chamber 12 at the opposite side connected to a pipe 13 leading to a double check valve device 14.

The diaphragm 9 is clamped between the armature 7 and a head 15, said head having a central passage 16 leading to a passage 17 in the armature 7 which opens to chamber 10. Communication from chamber 12 to chamber 10 through passage 16 is controlled by a release valve 18, and in axial alinement with said valve is a supply valve 19 contained in valve chamber 20, the valve 19 controlling communication from chamber 20, which is connected by pipe 21 to the auxiliary reservoir 3, to chamber 12.

The stem 22 of valve 19 carries a pin 23 engaging in an elongated slot 24 of an extension carried by the valve 18, and valve 19 is subject to the pressure of a spring 25. A rod 26 extends through a central bore of the armature 8 and engages in a central recess of the armature 7, and said rod is provided near its lower end with a collar 27 which is engaged by a spring 28.

At the lower end, the armature 8 is provided with a flange 29, and coil springs 30, disposed in recesses in the magnet casing, engage said flange.

Disposed in a cap plate 31, applied to magnet 5 is a valve 32 adapted to be engaged by the flange 29 upon downward movement of the armature 8, and said valve controls the venting of fluid under pressure from an emergency relay valve device 33 to chamber 34 which is open to the atmosphere through a port 35.

The relay valve device 33 comprises a casing containing a valve piston 36 subject on one side to the pressure of a coil spring 37 and provided with a restricted equalizing port 38.

A supplemental reservoir 41 is provided, which is adapted to be charged with fluid under pressure from the brake pipe 4 through a restricted port 42 and past a check valve 43, and the reservoir 41 is connected through pipe 39 with the space at the outer seated area of valve piston 36. The space at the inner seated area of the valve piston is connected to pipe 44, leading to the brake cylinder 1.

When the reservoir 41 is charged with fluid under pressure, fluid flows to the relay valve device through pipe 39 and thence through the restricted port 38 to the spring side of the valve piston. The fluid pressures being equalized on opposite sides of the valve piston, the spring 37 maintains same seated.

The magnet 5 is preferably controlled in a manner similar to that disclosed in a prior pending application of T. H. Thomas, Serial No. 158,935, filed January 4, 1927, and the magnet coil 6 is such that at a predetermined current flow, the armature 7 will be moved downwardly by the force of the magnet, so as to compress the spring 28 and thus cause the seat of valve 18 to move away from the valve. The brake cylinder 1 will then be open to the atmosphere by way of pipe 44, double check valve device 14, pipe 13 and chamber 12, and thence past the open valve 18 to exhaust port 11.

If it is desired to apply the brakes, the current flow to the magnet 5 is reduced a certain amount and this permits the spring 28 to move the armature 7, through stem 26, in an upward direction, so that the valve 18 is first caused to seat and then upon a further movement, the lost motion between the valve 18 and the stem 22 is taken up, and finally the further movement causes the opening of the supply valve 19.

Fluid under pressure is then supplied from the auxiliary reservoir 3, through pipe 21 and past the valve 19 to chamber 12, thence through pipe 13, past the double check valve device 14 to the brake cylinder 1.

When the pressure in the brake cylinder and in chamber 12 has been increased to a certain degree, the upward pressure of the armature 7 is overcome by the pressure in chamber 12 acting on the diaphragm 9, and said diaphragm then moves downwardly until the valve 19 is brought to its seat. Further flow of fluid from the auxiliary reservoir to the brake cylinder is then cut off.

If it is desired to increase the pressure in the brake cylinder, the current flow to the magnet 5 is further reduced, and the pulling force of the magnet 5 is further reduced, so that the spring 28 acts to again move the armature 7 upwardly to cause the unseating of valve 19.

The brakes are released by increasing the current flow to the degree at which the armature 7 is moved downwardly to permit the valve 18 to become unseated.

As so far described, the operation is quite similar to that of the construction described in the pending application of T. H. Thomas, hereinbefore referred to, and as the means for varying the current flow through the magnet 5 forms no part of my invention, it is not deemed necessary to show such means.

According to my invention, means are provided for effecting a high pressure emergency application of the brakes when the current flow through the electro-magnet 5 is reduced to a low degree or there is no current flowing through the magnet.

Normally, with the current flow above a certain low degree, the pull of the magnet 5 on the armature 8 is sufficient to cause the compression of the springs 30, so that the armature is maintained in the position shown in the drawing. When the current flow is sufficiently reduced or there is no current flowing, the armature 8 will be moved downwardly by the springs 30, so that the flange 29 will engage the stem of the valve 32 and will operate to open the valve.

Fluid under pressure is then vented from the spring side of the relay valve piston 36, so that the fluid pressure acting on the outer seated area of said piston causes outward movement of the valve piston, and thereby communication is opened from pipe 39 and the supplemental reservoir 41 to the brake cylinder 1. Fluid under pressure is thus supplied from said reservoir to the brake cylinder.

At the same time, the service portion of the device operates as in a service application of the brakes to open the valve 19 and permit the supply of fluid under pressure from the auxiliary reservoir 3 to the brake cylinder, so that a high brake cylinder pressure is obtained, due to the equalization of both reservoirs 3 and 41 into the brake cylinder.

Having now described my invention, what I claim as new and desire to secure by Letters Patent, is:—

1. In an electro-pneumatic brake, the combination with electro-responsive means operated upon a gradual reduction in current flow for effecting a service application of the brakes, of means operated by said electro-responsive means upon a failure of current for effecting an emergency application of the brakes.

2. In an electro-pneumatic brake, the combination with electro-responsive means operated as the current flow is reduced for effecting a service application of the brakes in proportion to the reduction in current flow, of means for effecting an emergency application of the brakes, and a spring for operating said means and released by said electro-responsive means only upon a reduction in current flow to a low degree for effecting an emergency application of the brakes.

3. In an electro-pneumatic brake, the combination with a brake cylinder, of valve means for controlling the supply of fluid under pressure to the brake cylinder, an electro-magnet having a solenoid core for operating said valve means, additional valve means for also supplying fluid under pressure to the brake cylinder, and an additional solenoid core operated by said magnet for effecting the operation of said additional valve means.

4. In an electro-pneumatic brake, the combination with a brake cylinder, of valve means for controlling the admission and release of fluid under pressure to and from the brake cylinder, an electro-magnet having a solenoid core for operating said valve means and subject to the pressure of a spring tending to operate said solenoid and valve means to supply fluid to the brake cylinder and to the pull of said magnet tending to release fluid from the brake cylinder, additional valve means for controlling the supply of fluid under pressure to the brake cylinder, and an additional solenoid core for said magnet subject to the pressure of a spring for effecting the operation of said additional valve means upon a reduction in current flow through said magnet to a low degree.

5. In an electro-pneumatic brake, the combination with a brake cylinder, of a source of fluid under pressure, valve means for controlling the supply of fluid under pressure from said source to the brake cylinder, an additional source of fluid under pressure, additional valve means for controlling the supply of fluid under pressure from said additional source to the brake cylinder, and an electro-magnet having two solenoid cores, one for operating each of said valve means.

6. In an electro-pneumatic brake, electro-responsive means for controlling the brakes comprising an electro-magnet having two armatures, valves controlled by one armature for controlling the application and release of the brakes, and valve means controlled by the other armature for effecting an emergency application of the brakes.

In testimony whereof I have hereunto set my hand.

UNCAS A. WHITAKER.